Nov. 4, 1969  R. M. JACKSON ET AL  3,476,073
TIRE UNDERINFLATION TELLTALE DEVICE
Filed Jan. 23, 1968  2 Sheets-Sheet 1
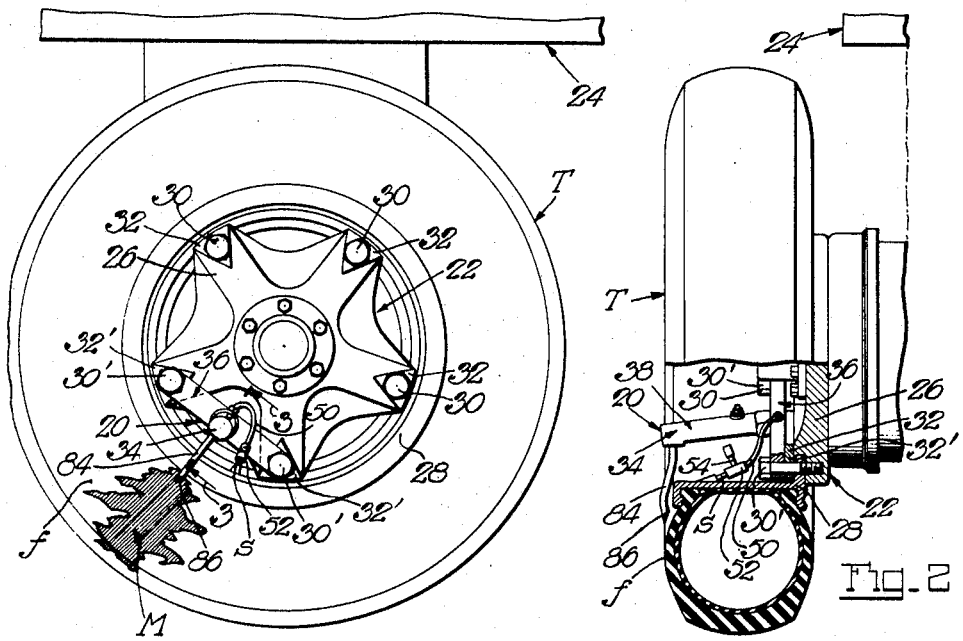
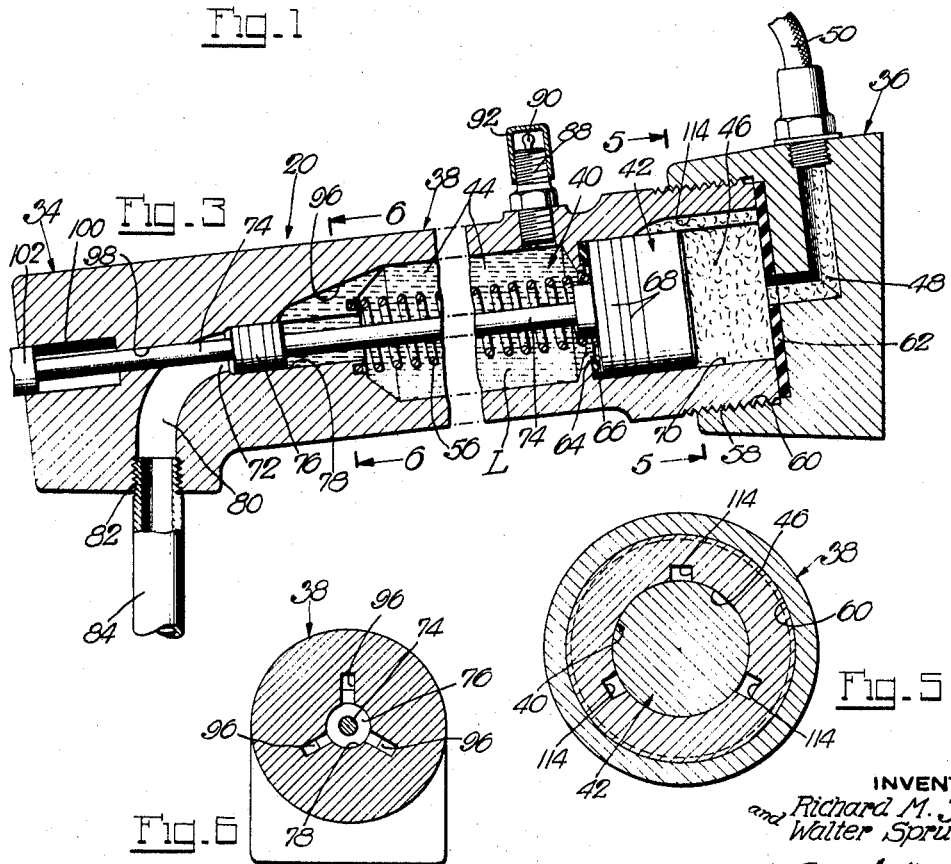
INVENTORS
Richard M. Jackson
and Walter Spruegel
By: [signature]
ATTORNEY

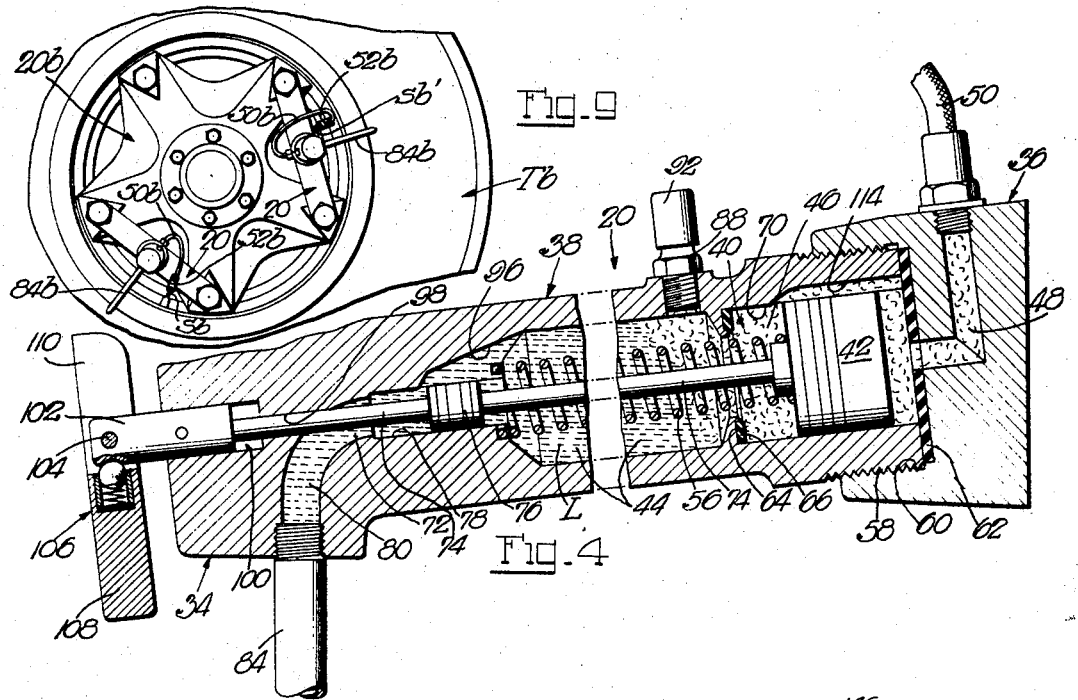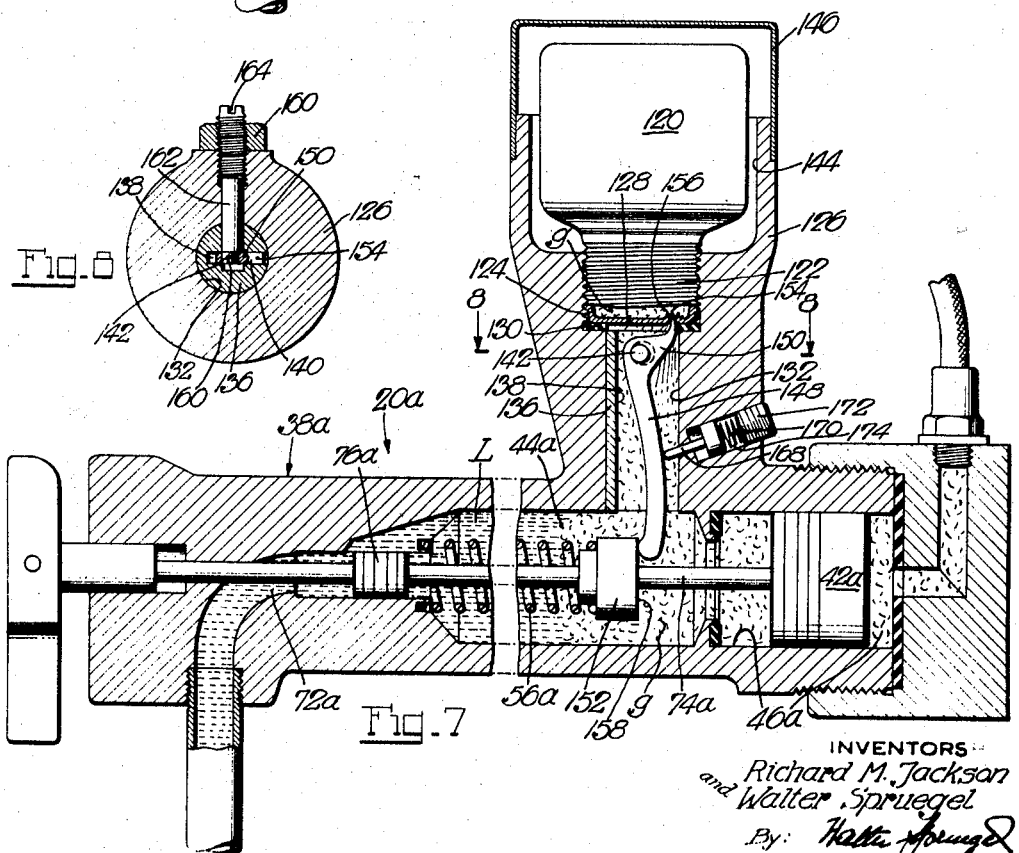

United States Patent Office 3,476,073
Patented Nov. 4, 1969

3,476,073
TIRE UNDERINFLATION TELLTALE DEVICE
Richard M. Jackson, 42 Augur St., Hamden, Conn. 06517, and Walter Spruegel, New Haven, Conn.; said Walter Spruegel assignor to said Richard M. Jackson
Filed Jan. 23, 1968, Ser. No. 699,952
Int. Cl. B60c 23/02, 23/06
U.S. Cl. 116—34                                           17 Claims

ABSTRACT OF THE DISCLOSURE

Received in a cylinder on a truck wheel is a plunger dividing the cylinder chamber into opposite end compartments, of which one compartment is in communication with the air in the tire on the wheel, and the other compartment holds a liquid and has an outlet which is normally closed by the plunger, with the plunger being by a spring displaced so as to open the outlet when confronted with air below a safe minimum tire pressure whereupon the liquid will escape through the outlet and spray against the tire to leave thereon a telltale blot.

---

This invention relates to tire-deflation telltale devices in general, and to devices of this type for trucks and other heavy-duty vehicles in particular.

It is the primary aim and object of the present invention to provide a device of this type which on deflation below a safe minimum pressure of a tire on a wheel of a truck or other heavy-duty vehicle will produce on the wheel, and preferably on the tire thereon, a telltale mark that is readily discernible from many angles by anyone nearby, including the driver in the cab through either side mirror thereon. In thus producing the telltale mark directly on the affected tire, its warning message is particularly effective not only because the mark unmistakably identifies the affected tire but, even more important, its appearance on the tire draws overwhelming attention since a tire in service is hardly ever marked for any purpose.

It is another object of the present invention to provide a device of this type which is carried by a vehicle wheel and adapted to produce on the tire thereon the aforementioned telltale mark when the tire pressure drops below a safe minimum pressure, with the device applying the telltale mark by spraying a substance directly against the tire to form thereon a clearly discernible telltale blot of considerable spread and random outline. With this arrangement, the telltale blot is not only readily discernible by its size, but has, by virtue of its random outline, a particularly bizarre appearance the danger signal meaning of which will be inescapable to the observer. The inescapability of this danger signal meaning is, of course, of the greatest importance to the driver and other attending personnel during truck runs as well as truck stops, including rail transport of trailers, for unmistakable and timely notice of an underinflated tire and equally timely precautionary measures will prevent not only complete ruin of the tire but, even more important, potentially serious and even fatal accidents.

It is a further object of the present invention to provide a device of this type which is not only of exceedingly simple and condensed construction and lends itself to highly efficient mass production at very low cost, but is also a self-contained unit which may be installed on any wheel of existing and new vehicles with the greatest facility, involving only a few and quick screw manipulations for its mount on the wheel and operating connection with the tire thereon, with this operating connection being, moreover, with the exposed and readily accessible valve stem of the tire. Thus, the overall cost in acquiring these units and installing them on the heavy-load wheels of vehicles is very low, and their ready mounting on wheels and equally ready operating connection with the valve stems of the tires thereon is also highly advantageous for dual tires on a wheel, in that two identical units may be mounted on the most readily accessible out-facing part of the wheel in position to apply telltale blots to the same, outer, tire. Further in connection with dual tires on a wheel, in thus applying a telltale blot on the outer tire on deflation of either tire below a safe minimum pressure, all the aforementioned advantages of such a blot directly on a tire are secured, and direct and unmistakable identification of the particular tire involved, and even if both tires should be involved, may advantageously be afforded without any extra cost whatsoever by using different-color telltale liquid in the respective units.

Another object of the present invention is to provide a device of this type having as its primary and largest component a relatively small and light-weight cylinder and a plunger therein, and the rest of the parts being much smaller and few in number and of standard variety available on the market at low cost, with the plunger dividing the cylinder chamber into opposite end compartments, of which one compartment is in communication with the air in the assoicated tire conveniently through a flexible hose connection with the exposed valve stem of the tire, and the other compartment holds the telltale liquid and has an outlet with a tube extension for directing the liquid on its discharge from the cylinder against the outer face of the tire, and with the plunger being by the air pressure in the tire held in a normal position against a stop in the cylinder in which it closes the outlet, but being by a spring acting thereon displaced into a position to open the outlet for the discharge of the telltale liquid when the tire pressure drops below a safe minimum pressure.

A further object of the present invention is to provide a device of this type in which the telltale liquid in the aforementioned cylinder compartment is kept under substantially atmospheric pressure while the tire pressure is above or at a safe minimum pressure, and provisions are made for applying pressure to the liquid in this cylinder compartment substantially when the plunger on its aforementioned displacement opens the outlet in order forcefully to eject this liquid from the cylinder compartment and project it against the outer face of the tire. With this arrangement, it is easy to keep the liquid compartment sealed against liquid leakage therefrom for the longest time and under any, and even the most severe, riding conditions while the tire pressure is above or at the safe minimum pressure, yet when dropping tire pressure calls for a telltale blot the telltale liquid is under pressure forced from the cylinder compartment and projected againts the tire in jet-like fashion so that a stand-out blot formation on the tire is assured even at maximum riding speeds and/or the strongest wind conditions. Moreover, the jet-like impact of the discharge liquid on the tire will produce a telltale blot of particularly bizarre outline, and, hence, telling effect on an observer.

Another object of the present invention is to provide a device of this type in which pressure is applied to the telltale liquid in the cylinder compartment as aforementioned, by conveniently and advantageously admitting compressed gas into this cylinder compartment substantially when the plunger on its operational displacement opens the outlet.

It is another object of the present invention to provide a device of this type in which the aforementioned compressed gas for forcing the telltale liquid from the cylinder is compressed air from the tire. To this end, there is provided between the air and liquid compartments of the cylinder a by-pass which is closed by the plunger when in its normal position, but is opened on operational displacement of the plunger to open the outlet from the liquid compartment, with the spring-urged plunger being, on continued but slight air-pressure drop in the tire while air therefrom sweeps through the liquid compartment, forced against a seal in the end of the air compartment to prevent further air escape from the tire through the device and, hence, a further drop in tire pressure at least from this cause.

It is a further object of the present invention to provide a device of this type in which the compressed gas for forcing the telltale liquid from the cylinder is, alternatively, contained in the device itself, without, however, being in communication with the liquid except on operational plunger displacement to open the outlet from the liquid compartment. To this end, the compressed gas is stored in a sealed replaceable bulb in the device, and there is provided a pointed punch and an operating connection between the plunger and this punch whereby the latter punctures the bulb for release of its compressed gas content into the liquid compartment when the plunger is operationally displaced to open the outlet from the liquid compartment. This arrangement thus has all the aforementioned advantages of sweeping the liquid compartment with compressed air from the tire, yet while the compressed air in the tire is the control fluid for the plunger, this air is easily sealed, and in fact locked in the device so as never to leak from the latter under any circumstances.

Another object of the present invention is to provide a device of this type in which the aforementioined punch and its operating connection with the plunger is a single, conveniently blanked, lever element pivoted in the device and having opposite arms, of which one arm is long and with its end in follower engagement with the plunger, and the other arm is much shorter and formed as the punch for unfailingly puncturing the bulb with the multiple leverage afforded by this element on operational displacement of the plunger to open the outlet from the liquid compartment, and the pivot for this element is advantageously an eccentric portion of a pin which is angularly adjustable for adjustment of the punch in unfailing puncturing relation with an inserted, preferably screwed-in, bulb in the device under the contemplated conditions.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary side view of a heavy-duty vehicle showing one of the wheels thereof with an installed telltale device embodying the present invention;

FIG. 2 is a fragmentary end view of the same vehicle with the wheel and tire thereon being shown partly in section and partly in elevation;

FIG. 3 is an enlarged section through the featured telltale device taken substantially on the line 3—3 of FIG. 1;

FIG. 4 is a section through the telltale device similar to FIG. 3, but showing the same in a different operating condition;

FIGS. 5 and 6 are cross-sections through the telltale device taken on the lines 5—5 and 6—6, respectively, of FIG. 3;

FIG. 7 is a longitudinal section through a telltale device embodying the present invention in a modified manner;

FIG. 8 is a section taken on the line 8—8 of FIG. 7; and

FIG. 9 is a fragmentary side view of dual tires on a vehicle wheel showing telltale devices for both tires.

Referring to the drawings, and more particularly to FIGS. 1 and 2 thereof, the reference numeral 20 designates a telltale device for a pneumatic tire T on a wheel 22 of a vehicle 24, and especially a heavy-duty vehicle such as, for example, a truck having the usual driver's compartment or cab with side mirrors through which to observe the load-carrying tires when riding. The wheel 22 which may be conventional in every respect, provides the usual spider 26 on a drive axle and a demountable rim 28 on which the tire T is mounted, with the rim 28 being normally held on the spider 26 by bolts 30 through intermediation of lugs 32.

The telltale device 20 has major operating and mounting components 34 and 36, of which the operating component 34 is adapted to produce on the tire a telltale mark M when the tire pressure drops below a certain pressure, and more particularly below a safe minimum pressure, and the mounting component 36 is in the exemplary form of a mounting bar which extends between adjacent holding lugs 32' and is by the bolts 30' thereat mounted on the wheel 22.

The operating component 34 provides a casing 38 with a cylinder chamber 40 (FIG. 3), and a plunger 42 in the chamber 40 which divides the same into opposite end compartments 44 and 46, with compartment 44 holding telltale liquid L, and compartment 46 holding air from, and under the same pressure as in, the tire T. To the latter end, compartment 46 is in communication with the compressed air in the tire T, in this instance via a duct 48 in the mounting bar 36, a flexible hose connection 50 and a T-fitting 52 which serves as an adapter and is applied, preferably screwed, to the exposed valve stem S of the tire T (FIG. 2). The usual check valve is in this instance removed from the valve stem s and the check valve provided in the lateral branch 54 of the adapter 52 so that the tire may be inflated through this branch 54, but the compressed air in the tire will be in permanent communication with the compartment 46 through the adapter. The casing 38 is preferably a casting which at 58 is threadedly received in a recess 60 in the mounting bar 36 for its permanent assembly therewith, with the bottom of the recess 60 preferably receiving a sealing ring 62 which defines one end of the compartment 46 and on which the casing 38 is firmly seated to seal this compartment from the outside of the casing. Preferably provided in the cylinder chamber 40 is an intermediate annular shoulder 64 with the sealing ring 66 thereon against which the plunger 42 is held in a normal position by the compressed air in the compartment 46. The shoulder 64 thus defines the other end of the compartment 46 which is machined cylindrical and slidably receives the plunger 42, with the latter also having sealing rings 68 against the peripheral wall 70 of the compartment 46. Opposing the plunger 42 is a compression spring 56 in the compartment 44, with this spring being preloaded to displace the plunger from its normal position to an operating position explained hereinafter when the air pressure in the compartment 46 and, hence, also in the tire T drops below a given pressure. The other or liquid compartment 44 may, but need not, be cylindrical and may be of the volume shown or of any other volume to hold any desired amount of telltale liquid L. The liquid compartment 44 has an outlet 72 which is cooled by the plunger 42 when in its normal position in which it is seated against the sealing ring 66 (FIG. 3). To this end, the plunger 42 has in this instance a forwardly extending stem 74 with a valve member 76 that is slidably received in an axial valve chamber part 78 of the outlet 72 which over its remainder is an exemplary elbow passage 80 to its discharge end 82. Mounted in the discharge end 82 of the outlet 72 is a tubular member 84 which at its outer end 86 is arranged in fairly close proximity to the mounted tire T and adapted to direct discharging liquid against the latter, and preferably against its outer face f (FIGS. 1 and 2). The casing 38 is also provided with a filler nipple 88 having the usual check valve 90 and a movable protective cap 92, with telltale liquid L being introduced into the compartment 44 and the air therein simultaneously escaping through this nipple while holding the check valve 90 depressed in its open position. Preferably and advantageously, the telltale liquid is substantially under atmospheric pressure when introduced into the compartment 44 and while remaining therein, so that even slight leakage of liquid from this compartment is extremely unlikely for the longest time and under any, and even the most servere, riding conditions.

With the plunger 42 being in its normal position (FIG. 3), the valve member 76 is at the forward end of the valve chamber 78 in which it closes the outlet 72 from the liquid compartment 44. In order to open the outlet 72, the plunger 42 and its valve member 76 must be displaced to an extent just short of that shown in FIG. 4, i.e., until the valve member 76 uncovers the front ends of a plurality of grooves 96 in the casing 38 which are open to the valve chamber 78 over a substantial rear length thereof. In thus displacing the valve member 76 as just explained, the grooves 96, of which there are three in this instance (FIG. 6), form a bypass between the liquid compartment 44 and the outlet 72 around the valve member 76 through which liquid from this compartment will escape to and through the outlet 72. Accordingly, considerable rearward displacement of the valve member 76 is required before liquid may escape from the compartment 44, and this has a twofold advantage, in that in the normal position of the plunger 42 the valve member 76 is in quite extensive sealing relation with the valve chamber 78 ahead of the grooves 96, and the plunger 42 and its valve member 76 may under particularly severe shock even be momentarily displaced rearwardly without, however, opening the outlet 72.

In order to prevent opening of the outlet 72 when the tire T is deflated for any reason or is replaced with another tire, fore example, and also for filling the compartment 44 with telltale liquid L of the correct amount, provisions are made for temporarily locking the plunger 42 in its normal position (FIG. 3). To this end, the stem 74 of the plunger 42 extends forwardly beyond the valve member 76 and is received with a sliding fit in a bore 98 that leads to an enlarged counterbore 100 at the front end of the casing 38. The forward extension of the stem 74 is provided with a plunger-like part 102 which is slidably received in the counterbore 100, and at 104 pivotally carries a toggle member 106 (FIG. 4) having a handle end 108 and a bifurcated arm 110 which on manipulation of the toggle member into alignment with the part 102 cooperates with the forward end of the casing 38 in shifting the plunger 42 and its valve member 76 into the normal position in FIG. 3 against the compression of the spring 56. In order to restore the device for operation, it is, of course, necessary to turn the toggle member 106 to the inoperative position in FIG. 4.

In normal operation of the deivce 20, the plunger 42 and its valve member 76 will be held in the normal position in FIG. 3 by the compressed air in the compartment 46 as long as the tire pressure is within a safe operating range, say from about 40 lbs. per square inch to an upper permissible limit. If for any reason, such as a leak in the tire or its check valve, the tire pressure drops close to the lower limit of the safe operating range, the preloaded spring 56 will begin to overpower the compressed air in the compartment 46 and displace the plunger 42 and its valve 76 rearwardly without, however, causing opening of the outlet 72 until on further drop of the tire pressure just below the lower limit of the range the valve member 76 begins to open the outlet 72 and opens the same further on continuing drop in the tire pressure (FIG. 4). The arrangement could be such that on opening of the outlet 72 the liquid will escape from the compartment 44 through the outlet 72 and continuing tubular member 84 and splash against the outer face $f$ of the tire T by centrifugal force when the vehicle is in motion. However, for several good reasons it is far preferred to eject the telltale liquid L from the device and project it against the tire with considerable force by applying pressure to it just before, or substantially when, the valve member 72 begins to open the outlet 72. To this end, compressed gas is preferably and advantageously resorted to, and the compressed gas used in this instance is compressed air in the compartment 46. For that purpose, the peripheral wall 70 of the compartment 46 is provided over a rear length thereof with a plurality of longitudinal grooves 114, in this instance three (FIG. 5), which on operational plunger displacement provide communication between the compartments 46 and 44 (FIG. 4), with compressed air from the compartment 46 applying pressure to the liquid in compartment 44 and forcefully blowing it from the latter and against the face $f$ of the tire T. On continued slight further drop of the tire pressure after ejection of the telltale liquid from the device, the spring 56 will continue to displace the plunger 42 until the same becomes seated on the rear sealing ring 62 in the compartment 46, whereupon air from the tire may no longer escape through the device. The advantages of thus forcing the telltale liquid from the device and against the tire are quite obvious, and chief among these advantages are unfailing and complete as well as quick discharge of the liquid from the device when the vehicle is in motion or at rest, including rail transport when the vehicle is a trailer, projection of the forced liquid in jet-like fashion against the tire whereby a clearly discernible telltale mark on the tire is assured even at maximum riding speeds and/or the strongest wind conditions, and further by reason of the projection of the forced liquid jet-like against the tire the ensuing telltale mark M is a blot of considerable spread and random outline having a particularly bizarre appearance (FIG. 1) which conveys a particularly telling warning signal to the driver and other attending personnel. The telltale blot M being preferably on the outer face $f$ of the tire, may readily be observed from many angles and will be observed as readily by the driver in the driver compartment through one of the usual side mirrors which are always adjusted for viewing all load-carrying tires on the vehicle. Obviously, the present device must be provided for each load-carrying tire on the vehicle in order to extend its warning and safety feature to the entire vehicle.

The telltale liquid L may be of any suitable kind and also color which will be in sharp contrast to the usually dark appearance of the tire face $f$ as a background, with the liquid being non-flammable and having preferably a viscosity much greater than that of water and also containing a suitable antifreeze agent. Moreover, the telltale liquid must have good adherence on a tire face and even on dirt thereon, yet must be removable from the tire for reuse of the latter.

Reference is now had to FIG. 7 which shows a telltale device 20a that may in all respects be, and also perform, like the described device 20 of FIGS. 3 and 4, except that in the present device 20a compressed gas other than compressed air in the compartment 46a is used for forcing the telltale liquid L from the device to produce a telltale blot on the associated tire. In this case, the compressed gas $g$, which may be any suitable non-flammable type of gas, including air, is contained in a sealed metal or other bulb 120 having an exemplary threaded neck 122 with which it is removably mounted in a socket formation 124 in a lateral branch 126 of the casing 38a, with the closed end 128 of the neck being firmly seated against a sealing ring 130 in the socket formation 124 to seal the liquid compartment 44a and therefrom leading transverse bore 132 from the outside at this socket formation. Press-fitted or otherwise secured in the bore 134 is a plug 136 which has a longitudinal slot 138 for reception of a conveniently blanked lever element 140 on a pivot mount 142. The mounted bulb 120 is received in a partial receptacle 144 on the casing branch 126, and is fully protected against dirt, snow and rain by a removable cover 146 on the receptacle 144. The lever element 140 has two arms 148 and 150, of which arm 148 extends into operative relation with a collar formation 152 on the forward stem 74a on the plunger 42a, while the other arm 150 is formed as a pointed punch 154 which, on operational displacement of the plunger 42a and its valve member 76a to open to outlet 72a, will puncture the neck end 128 of the bulb 120 as at 156 for escape of the compressed gas from the bulb into the liquid compartment 44a and ensuing pressure-sweep of the liquid from this compartment and against the associated tire. The plunger-displacing spring 56a acts in this case against the collar-formation 152 on the plunger stem 74a so that the arm 148 of the lever element 140 may be in follower relation with the rear face 158 of the collar formation 152 to force the pointed punch 154 into and through the bulb neck end 128 at the proper time. It will also be noted that the arm 148 of the lever element 140 is much longer than the other lever arm 150, wherefore the punch 154 will unfailingly puncture the bulb with the multiple leverage afforded by this lever element on operational displacement of the plunger 42a and its valve member 76a. Further, to bring the pointed punch 154 into unfailing puncturing relation with the neck end 128 of a mounted bulb, the pivot 142 for the lever element 140 is preferably an eccentric end 160 on a pin 162 which is threadedly received in the casing branch 126 and otherwise fittedly received in the latter and also in the plug 136 (FIG. 8), with this pin 162 having in its outer end a slot 164 for a screw driver with which angularly to adjust the pin and its eccentric end 160 until the pointed punch is in correct puncturing relation with a mounted bulb, whereupon a lock nut 166 is tightened on the pin to lock the latter in its adjusted position. This is an initial one-time adjustment of the pin 162 with respect to a mounted and preferably empty or blank bulb, for once so adjusted the pointed punch will be in correct puncturing relation with any subsequently mounted bulb, especially since the punch 154 acts on the neck end 128 of the bulb off-center thereof and in close proximity to the sealing ring 130 on which the neck end of any mounted bulb is firmly seated and, hence, has negligible location tolerance with respect to the pointed punch. Also, by acting on the neck end of any mounted bulb next to the sealing ring 130, the neck end there is particularly inflexible and the pointed punch will puncture the same with the least force and utmost reliability. To withdraw the punch 154 from the neck end 128 of the bulb for its removal from the device, there may be provided in the casing branch 126 a spring-urged plunger 168 the spring 170 of which bears against a plug 172 which seals the opening 174 in which the plunger and its spring are secured.

The present device 20a has all the advantages of the earlier described device 20 of FIGS. 3 and 4, including forceful sweep of the telltale liquid L from the device and against the associated tire, yet the compressed air in the tire, while serving as the control fluid for the plunger 42a, is firmly locked in the air compartment 46a of the device under any and all conditions, so that at no time and even in the unlikely event of malfunction of the device from any cause the air pressure in the tire will never drop due to air leakage through the device.

Reference is now had to FIG. 9 in which two devices 20 are accessibly mounted on the outside of a wheel 20b with dual tires of which the outer tire Tb has the exposed valve stem sb and the inner tire has the valve stem sb' which in usual manner is also exposed on the outside of the wheel 20b. An adapter 52b is applied to each valve stem sb and sb' and each adapter is through a flexible hose 50b connected with the respective device 20. Each device 20 is thus associated with a tire, and the tubular member 84b of each device is arranged to direct telltale liquid against the outer face of the outer tire when the pressure in the associated tire drops below a given safe minimum pressure. Thus, a telltale blot on the outer tire will indicate an underinflated tire which may be the outer tire or the inner tire, with the tire affected being easily identified by marking the devices for the respective tires or in any other way. Another way which may be advantageous for ready identifiication of the underinflated tire is to use different-color liquids in the two devices, so that by the color of the telltale blot on the outer tire the affected tire is immediately identified. Of course, if each device should produce a telltale blot on the outer tire, this is certain indication that both tires are underinflated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. An underinflation telltale device for a pneumatic tire with an exposed valve stem on a vehicle wheel, comprising a casing mounted on the wheel and providing a cylinder chamber; a plunger in said chamber dividing the same into opposite end compartments of which one compartment contains telltale liquid and has an outlet for directing discharging liquid against the tire to form a telltale mark thereon, and the other compartment is in communication with said valve stem so as to hold air from the tire under the same pressure as in the latter; and preloaded spring means acting on said plunger and tending to displace the latter against the compressed air in said other compartment, with said air in said other compartment normally holding said plunger in position to close said outlet, and said spring means displacing said plunger to open said outlet on the drop of the air pressure in the tire below a certain pressure.

2. An underinflation telltale device as in claim 1, in which said cylinder chamber has an intermediate annular shoulder with a sealing ring thereon against which said plunger is held in a normal outlet-closing position by the compressed air in said other compartment.

3. An underinflation telltale device as in claim 2, in which said cylinder chamber has a longitudinal axis, said outlet is a cylindrical bore about said axis leading from said one compartment and having a tubular liquid-directing extension, and said plunger has a cylindrical valve element received in said bore to close the same, with said casing having a bypass from said one compartment to a part of said bore spaced from said one compartment, and said valve element closing said bypass when said plunger is in said normal position, but opening said bypass on said displacement of said plunger from normal position.

4. An underinflation telltale device as in claim 1, in which said one compartment has a liquid inlet with a check valve depressible for introduction of liquid into said one compartment and simultaneous escape of air from the latter.

5. An underinflation telltale device as in claim 2, in which said plunger has a stem projecting in sealed fashion to the outside of said casing, and there is further provided means on said casing outside thereof and in cooperation with said stem for manipulation to lock said plunger in said normal position against displacement therefrom and to release the same for such displacement.

6. An underinflation telltale device as in claim 1, in which said casing is provided with a bypass from one part to another part of said other compartment, with said plunger in outlet-closing position closing said bypass, but opening the latter on said plunger displacement to admit compressed air from said other compartment into said one compartment for forcing the liquid from the latter under pressure.

7. An underinflation telltale device as in claim 6, in which said cylinder chamber has an intermediate annular shoulder with a sealing ring thereon against which said plunger is held in a normal outlet-closing position by the compressed air in said other compartment.

8. An underinflation telltale device as in claim 7, in which said other compartment has also an endwall spaced from said shoulder and provided with a central opening, and a conduit connection between said opening and valve stem, said bypass is intermediate said shoulder and endwall, and there is further provided a sealing ring on said endwall against which said plunger is forced by said spring means on drop of the air pressure in the tire further below said certain pressure.

9. An underinflation telltale device as in claim 1, in which there is further provided a socket in said casing and a duct open to said socket and leading to said one compartment, with said socket adapted for removably mounting therein a sealed bulb containing compressed gas, a pointed punch mounted in said casing for movement in said duct into and from an operative position in which the same punctures a mounted bulb in said socket, and an operating connection between said plunger and punch whereby the latter is moved into said operative position on said plunger displacement to open said outlet.

10. An underinflation telltale device as in claim 9, in which said cylinder chamber has an intermediate annular shoulder with a sealing ring thereon against which said plunger is held in a normal outlet-closing position by the compressed air in said other compartment.

11. An underinflation telltale device as in claim 9, in which said duct is a cylindrical bore about an axis transverse to said chamber axis, and said socket is an enlarged tapped counterbore coaxial and continuous with said bore and open to the outside of said casing, with said counterbore having at its merger with said bore an annular shoulder with a sealing ring thereon on which a mounted bulb rests.

12. An underinflation telltale device as in claim 9, in which said duct is a cylindrical bore about an axis transverse to said chamber axis and open at its outer end to said socket, said punch and operating connection is a single lever element pivoted in said bore and having on opposite sides of its pivot two arms of which one arm is in follower relation with said plunger and the other arm is formed as a pointed punch.

13. An underinflation telltale device as in claim 12, in which said lever element is pivoted in said bore near said outer end thereof, and said one arm is a plurality of times longer than said other arm, so that said punch will puncture a mounted bulb with a force which is a multiple of the force of said plunger displacement.

14. An underinflation telltale device as in claim 13, in which the pivot for said lever element is an eccentric portion of a pin rotatably mounted in said casing, and there is further provided means for locking said pin in any angular position in said casing.

15. An underinflation telltale device as in claim 12, in which said lever element is flat and except for said pointed punch formation thereof is of uniform thickness, and there is further provided an apertured stud fittedly received in said bore and having a longitudinal slot in which said lever element is received and guided for pivotal movement.

16. An underinflation telltale device for pneumatic inner and outer dual tires on a vehicle wheel with an outwardly exposed side and with the valve stems of both tires being accessible at said exposed wheel side, comprising two units, each unit comprising a casing mounted on said wheel at said exposed side thereof and providing a cylinder chamber, a plunger in said chamber dividing the same into opposite end compartments of which one compartment contains telltale liquid and has an outlet for directing discharging liquid against the outer tire to form a telltale mark thereon, and the other compartment is in communication with one of said valve stems, and preloaded spring means acting on said plunger and tending to displace the latter against the compressed air in said other compartment, with said other compartments in both casings being in communication with said valve stems, respectively, so as to hold air from the associated tire under the same pressure as in the latter, said air in either of said other compartments normally holding the associated plunger in position to close the associated outlet, and either of said spring means displacing the associated plunger to open the associated outlet on the drop of the air pressure in the associated tire below a certain pressure.

17. An underinflation telltale device as in claim 16, in which the telltale liquid in said one compartment in said casings is of different colors, respectively.

References Cited

UNITED STATES PATENTS

| 2,834,206 | 5/1958 | Mindheim et al. | 73—159 |
| 2,836,143 | 5/1958 | Shofi | 116—32 XR |
| 3,091,365 | 5/1963 | Horner et al. | 222—5 |

FOREIGN PATENTS

| 997,162 | 7/1965 | Great Britain. |
| 455,969 | 4/1949 | Canada. |

LOUIS J. CAPOZI, Primary Examiner

U.S. Cl. X.R.

152—415